United States Patent [19]

Pineda et al.

[11] Patent Number: 4,751,446

[45] Date of Patent: Jun. 14, 1988

[54] LOOKUP TABLE INITIALIZATION

[75] Inventors: Juan A. Pineda, Sommerville; Michael C. Matter, Belmont, both of Mass.

[73] Assignee: Apollo Computer, Inc., Chelmsford, Mass.

[21] Appl. No.: 805,838

[22] Filed: Dec. 6, 1985

[51] Int. Cl.[4] .................... G06F 3/153; G09G 1/16; G09G 1/28

[52] U.S. Cl. .................... 340/703; 340/725; 358/89

[58] Field of Search .................... 340/703, 725; 358/89

[56] References Cited

U.S. PATENT DOCUMENTS

| | | | |
|---|---|---|---|
| 4,200,867 | 4/1980 | Hill | 340/703 |
| 4,225,861 | 9/1980 | Langdon, Jr. et al. | 340/703 |
| 4,439,759 | 3/1984 | Fleming et al. | 340/703 |
| 4,580,134 | 4/1986 | Campbell et al. | 340/703 |

FOREIGN PATENT DOCUMENTS

| | | | |
|---|---|---|---|
| 2032740 | 5/1980 | United Kingdom | 340/703 |

*Primary Examiner*—Howard A. Birmiel

*Attorney, Agent, or Firm*—Hamilton, Brook, Smith & Reynolds

[57] ABSTRACT

In a display system for a data processing system color words for display at sequential pixels are obtained by addressing a lookup table memory with addresses obtained from a bit map display memory. Initialization data is stored in the display memory and, during an initialization procedure, is applied to the lookup table along the same data path used by the addresses during display. In one system a multiplexer takes the form of a shift register into which sequential pixel addresses are applied in parallel to interleaved stages. The two LUT addresses are read out sequentially by shifting the shift register. During the initialization procedure shifting is disabled and the interleaved address and data bytes are applied along separate address and data lines to the lookup table. One data path can be utilized for either eight plane or four plane display. In another system, a buffer storage is provided between the address input to the LUT memory and the data input and, during the initialization procedure, data is stored in the buffer in alternate cycles of the display memory output.

19 Claims, 3 Drawing Sheets

LOOKUP TABLE INITIALIZATION

DESCRIPTION

TECHNICAL FIELD

The most prevalent display device used in data processing systems is the cathode ray tube video display monitor. Monitors operate on the same principle as conventional television in that an electron beam follows a raster scan. Control of the amplitude of the electron beam during the scan defines the video image. After completion of, for example, 520 horizontal scan lines the electron beam is blanked and returned to the first scan line of the raster during a vertical synchronization interval. With color monitors three electron beams are controlled for three primary colors. So that the electron beams can be conveniently controlled by sequential digital words, the raster scan, and thus the video display as a whole, is segmented into individual picture elements, or pixels. A new digital word is presented for each pixel to control the electron beam and thus the pixel color.

Typically, only a limited number of pixels are changed in color from frame to frame. Therefore, in order to minimize the operations required to generate the individual pixel colors for a frame and to increase the speed of the display unit, pixel colors for the entire frame are typically stored in a bit map display memory. A color word is stored in memory for each pixel and the color words are sequentially read out in synchronization with the raster scan. The color words stored in the display memory are changed under control of a central processing unit.

Because the display unit responds to digital words of limited numbers of bits, it can display only a limited number of discrete colors. Typically, the CRT display is able to respond to an eight bit byte for each of three CRT colors. In responding to a three byte input there are millions of possible color combinations, referred to here simply as colors, which may be displayed at any one pixel. However, in order to be able to display any one of those colors at any pixel, the display memory would necessarily be able to store a three byte word for each pixel and logic would be required for sequentially transferring each three byte word to the CRT display unit.

To minimize the storage capacity of the display memory and the size of the main data path, lookup table memories are often included in display systems. The lookup table design approach is based on the recognition that all of the possible colors need not be available for any particular application. For example, a lesser color resolution may be appropriate, or fine resolution in certain color ranges and coarser color resolution in other color ranges may be appropriate. Thus, a lookup table memory is initialized for a particular application to store a lesser number of possible colors which may be displayed for any pixel during the raster scan. The lookup table memory may provide a three byte output to control the CRT display in response to a memory address of a lesser number of bits. In an eight plane system the lookup table is addressed by eight bits; thus, there are 256 possible colors for any particular application even though the CRT display is capable of responding to several million different color words from a three byte input. With the lookup table approach the display memory stores addresses to the lookup table rather than actual color words, and the color words are stored in the lookup table memory at those addresses.

In other systems, the lookup table may be sufficiently large to store all possible color words. In such systems, the lookup table is provided as a mechanism for translating colors.

During initialization of a lookup table, color words are presented at a data input to the lookup table memory as each location of the memory is addressed. The data and addresses are provided by the CPU. A multiplexer selects the initialization address rather than the address from the display memory. Because the lookup table must be initialized during the vertical synchronization interval and the CPU may be relatively slow, it is often necessary to store the initialization data and addresses in a buffer memory.

In order to meet the speed requirements of the raster scan, the lookup table memory and some associated logic is often fabricated in ECL logic. ECL logic is more costly in power and other requirements and its use is therefore generally limited to those circuits where it is necessary. Slower TTL logic is typically used in the display memory and the CPU. With the different logic forms used for the different portions of the overall system, additional conversion circuitry must be provided between the TTL and ECL data paths.

DISCLOSURE OF THE INVENTION

A display system for a data processing system includes a video display unit for displaying discrete colors at individual pixels. A lookup table (LUT) memory responds to sequential multibit addresses received at an address input for providing sequential multibit color data which defines the color at each pixel to the video display unit. The LUT memory has a data input for receiving color data to be stored at the LUT memory addresses during an initialization procedure.

A display memory has a lookup table address stored therein for each pixel of a frame of pixels to be displayed. A display data path is provided from the display memory to the address input of the LUT memory.

During initialization, LUT color data is read from the display memory and passed along the display data path to the data input of the LUT memory. LUT addresses may also be taken from the display memory. Thus, the LUT memory may be initialized through the already provided display data path without the need for an additional initialization data path with its attendant requirement for logic conversion. Further, the display memory is utilized as the initialization buffer, so the requirement for an additional buffer memory is avoided.

The data required for initialization may be stored in the hidden memory portion of the display memory. Alternatively, initialization data may be written over display data in the display memory and the display data may then be written back into the display memory after initialization. Replacement of data in the display memory for initialization may occur during the raster scan portion of the video frame cycle.

In a preferred system, multiple LUT addresses are obtained from the display memory in parallel and those addresses are multiplexed to a common LUT address input to provide for the higher speed of the LUT addressing during the raster scan. During initialization in a vertical synchronization interval, the multiple addresses from the bit map memory are replaced by a single address and a single color word from the display memory. The two words are not multiplexed to the common address input but are kept separate with one applied to the address input and the second applied to the data input of the LUT memory.

The multiplexer may take the form of a shift register having two parallel, interleaved inputs. During display, one input is first applied to the address input of the LUT; the stored bits are then shifted, and the second input is applied to the address input in the next cycle. During the lookup table initialization operation, the shift is inhibited, and the two words are taken from parallel outputs from the shift register. Those parallel outputs are applied to the address and data inputs of the LUT as the LUT is write enabled for a particular color.

In a system which is able to operate in more than one configuration of different numbers of planes such as four planes or eight planes, only a portion of the bits of the second word from the display memory are applied to the data input of the LUT memory. The memory is enabled to write into only one portion of each addressed word during each write cycle.

In a system in which parallel addresses are not obtained from the display memory, but in which the addresses are read from the display memory at the same rate as they are applied to the LUT memory, an additional buffer is provided. During the initialization process, the words from the display memory are alternately delayed in the buffer so that address and data bits can be applied to the LUT simultaneously.

In another system, the addresses to the LUT memory during initialization are provided by separate hardware through a multiplexer and only the color data is obtained from the display memory.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Figure 1:
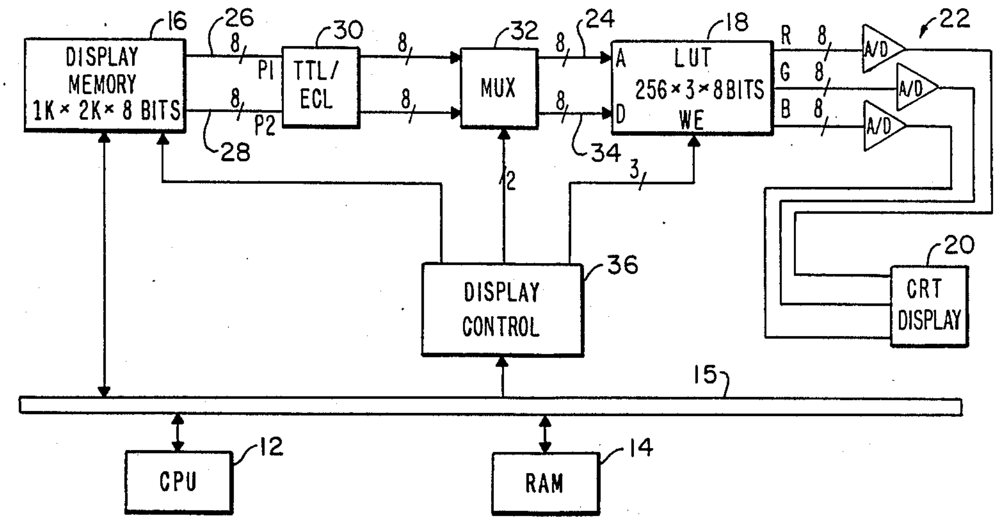
FIG. 1 is as block diagram illustration of a data processing system embodying the present invention.

FIG. 1 illustrates a data processing system employing a display system according to the present invention. The system includes the typical CPU 12 and main memory 14 on a bus 15 which includes data, address and control busses. A bit map display memory 16 is also connected to the bus 15. The display memory stores a lookup table address of the lookup table 18 for each pixel to be displayed on the CRT display 20. Because the CRT is an analog device, the display unit includes digital to analog converters 22 between the lookup table and the CRT. If, for example, the CRT display is to display a frame of 1000 by 1000 pixels, the display memory 16 would store a bit map of 1000 by 1000 addresses to the LUT. In addition, the display memory may include hidden memory which may be on the order of magnitude of the bit map. That hidden memory is used for storing fonts, tile patterns such as stipple, the shape of the cursor, shading, and other features of a display. In an eight plane system in which the address to the lookup table has eight bits, a display memory of 1000 by 2000 by 8 bits may be provided. At the lookup table, each eight bit address defines 256 address locations, each of which stores three bytes of a color word, so there are 256 possible colors displayed on the CRT 20 at any time. Color here refers to any combination of two or more levels of the one or more CRT colors, including gray.

With each pixel to be displayed by the CRT during a raster scan, an eight bit address 24 is provided to the lookup table. In order that the display memory need not operate at the same speed as the lookup table memory, two addresses are simultaneously read from the display memory at 26 and 28. Both addresses are converted to ECL logic in a TTL to ECL converter 30 and applied to a multiplexer 32. During the raster scan the parallel addresses are alternately applied by the multiplexer to the address input 24.

The circuitry thus far described is conventional. The usual display system would include additional TTL/ECL conversion circuitry and possibly an additional initialization buffer memory connected from the bus line 15 to an additional multiplexer. That additional circuitry would apply addresses to the address input 24 and data to a data input 34 during the initialization process. In accordance with the present invention that additional data path is avoided.

In accordance with one embodiment of the present invention the color words to be stored in the lookup table and their addresses are initially stored in the hidden memory portion of the display memory 16. The initialization addresses and data require only a small portion, in the order of one percent, of a typical hidden memory. When the LUT is to be initialized, the initialization addresses and data may be read from the hidden memory onto lines 26 and 28 during a vertical synchronization interval when display addresses are not taken from the bit map. They are converted to ECL logic by the converter 30 and applied to the multiplexer 32. During the initialization procedure, however, the multiplexing operation of multiplexer 32 is disabled such that the two bytes applied thereto are retained in parallel and are applied to the address and data inputs 24 and 34 of the lookup table. The eight bits on line 34 represent the eight bits to be stored for a particular CRT color at the address indicated on line 24. All three CRT colors for a common address are stored in three successive cycles. The portions of memory dedicated to the respective colors are individually enabled by a display control 36 in respective write cycles.

Figure 2:
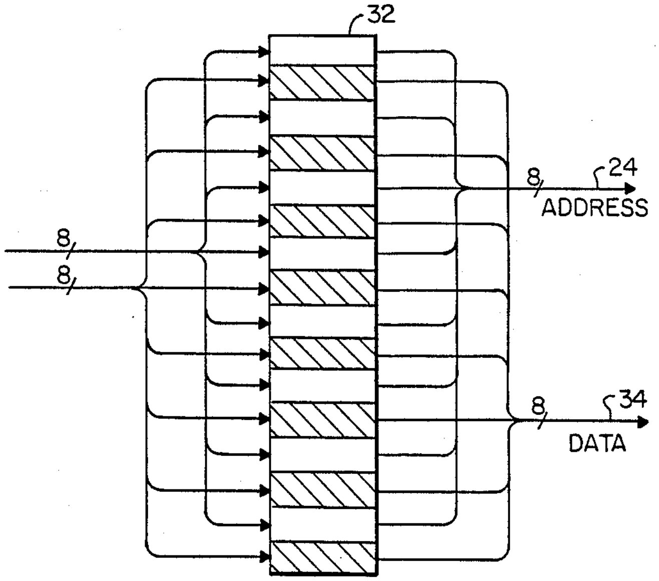
FIG. 2 is a schematic illustration of a multiplexing shift register used in the embodiment of FIG. 1.

A shift register suitable for use as the multiplexer 32 is illustrated in FIG. 2. The two bytes from the display memory are applied in parallel to interleaved stages of the shift register. Thus, the upper byte is shown to be applied to the clear stages and the lower byte is shown to be applied to the crosshatched stages. During the raster scan, only the outputs from the clear stages are utilized. After the two bytes are read in parallel into the shift register, the first is read onto the address line 24. Then, the register is shifted by display control 36 such that the second byte moves into the clear stages and that byte is available on line 24 to the LUT. The output on line 34 is of no consequence because the LUT only looks to its data input with a write enable.

During the LUT initialization process, shifting of the register is disabled by display control 36. Thus, after the two bytes are loaded into the shift register they remain available on the respective outputs. One is applied to the address line 24 and the other is applied to the data line 34. The data on line 34 is stored in the address location for one of the three CRT colors with the write enable for that CRT color. It can be seen, then, that the address and data inputs to the LUT during the initialization procedure are obtained without any additional components in the data path.

In the systems thus far described, the initialization data was stored in the hidden portion of the display memory. The present invention may be used even where no hidden memory is provided. In such a system, the data to be stored in the LUT would be written over pixel data by the CPU and that data would be rewritten into the bit map after initialization. If, for example, the LUT data were loaded into the bit map at the addresses corresponding to a center line of the raster scan, the LUT data could be written into the bit map shortly after display of that line on the CRT even as the raster scan continued. The initialization procedure would then take place during the vertical synchronization. The pixel data would be reloaded into the bit map before the raster scan again reached the center line. Such an approach provides a significantly greater amount of time than is available in the vertical synchronization interval for loading the LUT data into the bit map and then reloading the pixel data. Initialization of the LUT memory would still take place during the vertical synchronization interval, which is typically less than 1 millisecond, but the loading and reloading of the bit map could take place over a substantially larger amount of time in the order of 15 milliseconds which approaches the entire frame time.

Figure 3:
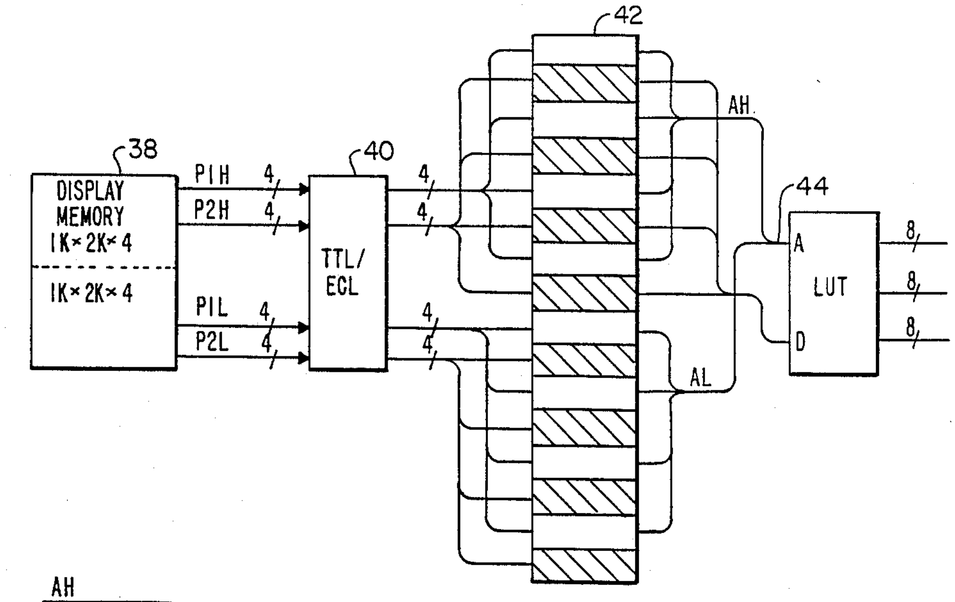
FIG. 3 is a block diagram illustration of an alternative embodiment of the invention for use in either an eight plane or a four plane system.

A system designed such that the same data path can be used for either a four plane or an eight plane display is shown in FIG. 3. In a four plane display only a four bit address would be provided to the LUT. In such a system the capacity of the display memory can be reduced by half, and the LUT could be reduced from $256\times3\times8$ to $16\times3\times8$. In an eight plane system both $1K\times2K\times4$ portions of the display memory 38 illustrated in FIG. 3 would be utilized to provide a first eight bit address comprising PlH and PlL and a second eight bit address comprising P2H and P2L. However, with four plane operation a portion of the memory would be eliminated and two four bit addresses would be obtained from the display memory for each pair of pixels. For the hardware shown, the lower portion of the display memory would be eliminated, leaving the addresses PlH and P2H. However, any set of planes may be deleted so long as the hardware is designed accordingly. As before, the addresses taken from the display memory are applied through TTL/ECL conversion circuitry 40 and applied to the multiplexer 42 which takes the form of a shift register.

During raster scan in the eight plane system the parallel bytes are applied to the shift register 42 and are sequentially applied, by combination of AH and AL, to the address line 44 of the LUT. In four plane operation the lower four bits of each of the bytes would be zeros in view of the lack of the lower portion of the display memory 38, and the $16\times3\times8$ LUT would be addressed by the upper four bits of each address byte. Again, three eight bit color bytes would be generated for each pixel but there would be only 16 possible colors.

Figure 4:
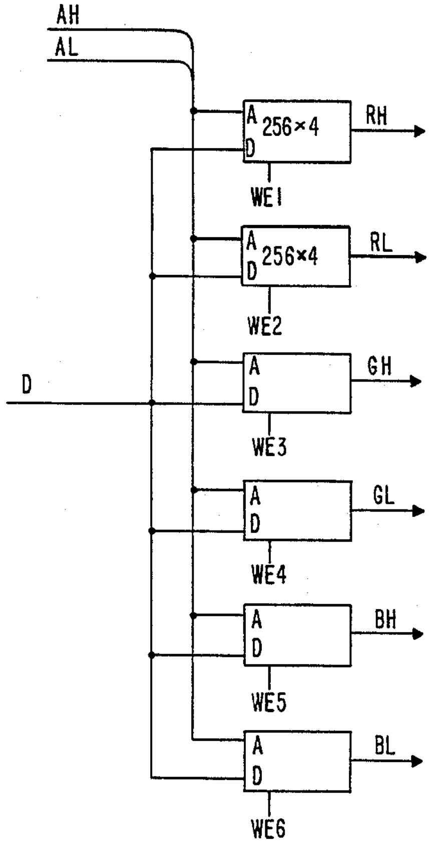
FIG. 4 is a schematic illustration of an LUT memory used in the embodiment of FIG. 3 in an eight plane system.
Figure 5:
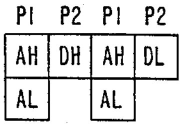
FIG. 5 is an illustration of the bytes obtained from the display memory during successive cycles in an initialization process for the eight plane system of FIG. 3.

A difficulty arises in attempting to use the same data path, including converter 40 and multiplexer 42, for both eight plane and four plane operation. In both cases an eight bit color word must be stored in the LUT for each address. However, in four plane operation the lower four address bits from the display memory do not exist because of the elimination of the lower portion of the display memory 38, and the eight data bits are not available with each write cycle. To overcome this problem, each color byte at each address is loaded in two cycles for both eight plane and four plane operation. Only four bits of each color byte are enabled in each write cycle. To that end, the logical arrangement of the LUT memory shown in FIG. 4 is utilized for the eight plane system. As in the prior system, the LUT is addressed during the initialization procedure by the eight bit address which is the combination of AH and AL. However, only the upper four bits of the parallel word are applied to the data input of the LUT. The first four bits to be stored at an address are, for example, stored as the upper four bits RH of the red color byte, the next four bits are stored as the remainder of the red color byte at RL and so on. With a common address applied to the address input of the LUT the three color bytes are stored in six write cycles. FIG. 5 illustrates the significance of each of four successive bytes read from the display memory during the initialization procedure.

Initialization of the four plane system using the shift register 42 of FIG. 3 is possible, even though only four bits are available at each of Pl and P2, because only four bits are required at the data input for each write cycle. The four bits of AL can be ignored by the four plane system.

Figure 6:
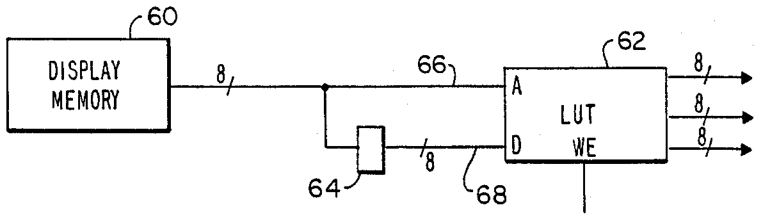
FIG. 6 is a block diagram illustration of yet another embodiment of the invention in which LUT addresses are read from the display memory at the same rate as they are applied to the lookup table memory.

FIG. 6 illustrates a further embodiment in which a fast display memory 60 is provided so that a single address can be read from the bit map display memory for each address required by the LUT 62. An additional buffer 64 is provided for initialization. During initialization every other byte taken from hidden memory is applied to the data storage buffer 64 which holds the byte until the next byte is provided on the address line 66. With a color byte thus held on line 68 and a corresponding address byte held on line 66 the LUT is write enabled to write the color byte on line 68 into memory. This system does require the addition of the buffer memory 64 but makes use of the high speed memory without any additional TTL/ECL conversion circuitry.

Figure 7:
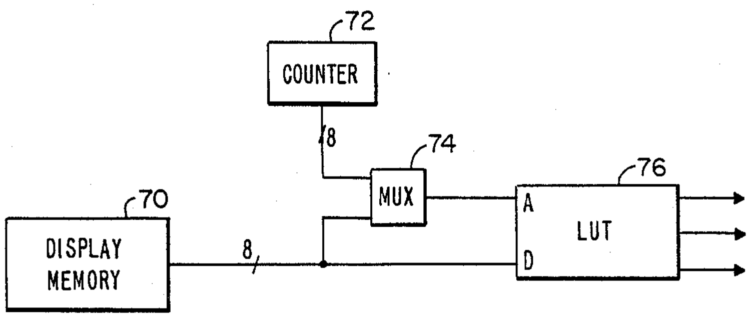
FIG. 7 is a block diagram illustration of yet another embodiment of the invention in which LUT addresses are obtained from separate hardware during the initialization process.

A further embodiment of the invention in which, during initialization, only the display data is taken from the display memory 70 is illustrated in FIG. 7. This approach does require added circuitry in the form of an address counter 72 and a multiplexer 74 but it doubles the rate at which the LUT can be loaded. The system of FIG. 7 is shown with a direct display data path from the display memory 70 to the LUT 76, but it will be recognized that the data path may be as shown in either of FIGS. 1 or 3. During the display mode, the address bytes from the display memory are applied through the multiplexer 74 to the address input of the LUT. During initialization, however, the multiplexer is switched such that the initialization addresses are obtained from an eight bit counter 72. With write enable, the data from the display memory 70 is loaded into the LUT at the address indicated by the counter 72. This system does require the additional hardware of the counter and multiplexer which would most likely be in ECL logic. However, there is still no need for a fast display buffer for the color data. The display memory serves that function and is already designed for high speed.

While the invention has been particularly shown and described with reference to preferred embodiments thereof, it will be understood by those skilled in the art that various changes in form and details may be made therein without departing from the spirit and scope of the invention as defined by the appended claims.

We claim:

1. A display system for a data processing system comprising:

a video display unit for displaying discrete color levels at individual pixels;

a lookup table (LUT) memory responsive to sequential multibit addresses received at an address input thereof for providing sequential multibit color data outputs to the video display unit to define the color at each pixel, the LUT memory further having a data input for receiving color data to be stored at the LUT memory addresses during an initialization procedure;

a display memory having stored therein lookup table addresses for each pixel of a frame of pixels to be displayed by the display unit;

a display data path from the display memory to the address input to the LUT memory; and lookup table initialization control means for directing color data from the display memory on the display data path to the data input of the LUT memory during initialization of the LUT memory.

2. A display system as claimed in claim 1 further comprising a multiplexer for multiplexing plural multibit inputs read in parallel from the display memory to a single address input to the lookup table memory and further comprising means for disabling the multiplexing operation during lookup table initialization such that the plural inputs are coupled directly to the address and data inputs of the LUT memory.

3. A display system as claimed in claim 2 wherein the multiplexer is a shift register and the plural addresses from the display memory are applied in parallel to interleaved stages of the shift register and alternate stages of the shift register are connected to the address input and to the data input of the LUT memory.

4. A display system as claimed in claim 2 for operation on either of 2 planes, only a portion of the bytes of one of the plural inputs to the multiplexer being applied to the data input of the LUT memory, and further comprising means for write enabling only a portion of each word of the LUT memory address by the other multibit input during each write cycle.

5. A display system as claimed in claim 4 wherein the multiplexer is a shift register and the plural addresses from the display memory are applied in parallel to interleaved stages of the shift register and alternate stages of the shift register are connected to the address input and to the data input of the LUT memory.

6. A display system as claimed in claim 1 further comprising means for generating addresses to the lookup table and for applying those addresses as an alternative address input to the LUT memory during initialization.

7. A display system as claimed in claim 1 comprising a buffer storage between the address input to the lookup table memory and the data input and means for storing alternate multibit signals on the address input in the storage buffer during the initialization procedure and means for enabling the lookup table write operation with alternate signals on the address line.

8. A display system as claimed in claim 1 wherein the display memory includes hidden memory storage capacity in addition to the storage capacity required for storing an LUT address for each pixel of a full display frame, the color data being stored in the hidden memory of the display memory.

9. A display system as claimed in claim 1 further comprising means for writing the color data over the lookup table addresses in the display memory for initialization of the LUT memory and means for reloading the lookup table addresses in the display memory after initialization of the LUT memory.

10. A method of addressing a lookup table (LUT) memory in a display system and initializing the LUT memory, the LUT memory storing color data to define the color at each pixel of a display unit, the method comprising:

during display of color data from the lookup table sequentially applying addresses from a display memory to an address input of the lookup table memory to address color words and applying the addressed color words to the display unit; and during an initialization procedure, reading color data from the display memory and applying the color data to the data input of the lookup table memory, such that the addresses are applied from the display memory to the lookup table memory along a data path during display and the color data is applied from the display memory to the lookup table memory along a common data path during initialization.

11. A method as claimed in claim 10 further comprising, during display of color data, multiplexing plural multibit inputs read in parallel from the display memory to a single address input to the lookup table memory and, during the initialization procedure, disabling the multiplexer operation and coupling the plural multibit inputs directly to the address and data inputs of the LUT memory.

12. A method as claimed in claim 11 wherein the plural multibit inputs are multiplexed by applying the inputs in parallel to interleaved stages of a shift register and, during display of color data, shifting the multibit inputs in the shift register to apply alternate multibit inputs to the address input of the LUT memory.

13. A method as claimed in claim 11 further comprising applying only a portion of a multibit input to the data input of the LUT memory during initialization and enabling only a corresponding portion of each addressed word in the LUT memory during each write cycle of the memory.

14. A method as claimed in claim 10 further comprising generating addresses to the lookup table separate from the display memory and applying those addresses to the address input of the LUT memory during initialization.

15. A method as claimed in claim 10 further comprising storing alternate multibit signals on the address input to the LUT memory in a storage buffer during the initialization procedure and enabling the lookup table write operation with alternate signals on the address line.

16. A method as claimed in claim 10 wherein the color data is stored in hidden memory of the display memory.

17. A method as claimed in claim 10 further comprising, during the initialization procedure, replacing address data in the display memory with color data, applying the color data to the data input of the lookup table memory and thereafter replacing the color data with the addresses in the display memory.

18. A method as claimed in claim 17 wherein the initialization procedure overlaps the raster scan of the display unit such that data is replaced in the display memory as addresses are applied to the lookup table memory to apply color words to the display unit.

19. A method as claimed in claim 10 further comprising, during the initialization procedure, reading addresses from the display memory and applying those addresses to the address input of the lookup table memory.

* * * * *